United States Patent [19]

Robinson

[11] E Re. 28,679

[45] Reissued Jan. 13, 1976

[54] BURNERS

[75] Inventor: Edgar Clarence Robinson, North Vancouver, Canada

[73] Assignee: International Industries Ltd., Burnaby, Canada

[22] Filed: Nov. 16, 1972

[21] Appl. No.: 307,199

Related U.S. Patent Documents

Reissue of:

[64] Patent No.: 3,620,657
Issued: Nov. 16, 1971
Appl. No.: 36,987
Filed: May 13, 1970

[52] U.S. Cl. ..... 431/9; 431/116
[51] Int. Cl.[2] ..... F23L 7/00
[58] Field of Search ..... 431/9, 115, 116, 188

[56] References Cited

UNITED STATES PATENTS

| | | | |
|---|---|---|---|
| 2,918,117 | 12/1959 | Griffin | 431/188 X |
| 3,277,945 | 10/1966 | Vermes | 431/116 X |
| 3,366,154 | 1/1968 | Walsh et al. | 431/116 |
| 3,545,902 | 12/1970 | Bailey | 431/116 |

*Primary Examiner*—Edward G. Favors
*Attorney, Agent, or Firm*—C. C. Kent; K. M. Hill

[57] ABSTRACT

An oil burner consists of an outer jacket surrounded and spaced from an inner burner tube to provide a surrounding counterflow chamber. Jacket and tube project horizontally inwards from the surrounding combustion chamber wall. Counterflow chamber is substantially closed at both ends. Tube projects inwardly beyond counterflow chamber and terminates in an upfacing burner head. Communication exists at opposite ends of the part of tube surrounded by counterflow chamber. At startup a tongue of flame travels through tube from an injector nozzle. Part of flame counterflows back through surrounding chamber and recirculates through tube. Another part of flame proceeds on to burner head. When parts sufficiently heated, flame in tube is caused to be extinguished and is replaced by hot clear blue flame jets from burner and a multiapertured band in tube within limits of counterflow chamber at end thereof remote from nozzle where counterflow originates. Combustion-supporting air to both chambers adjustably admitted at nozzle end.

34 Claims, 7 Drawing Figures

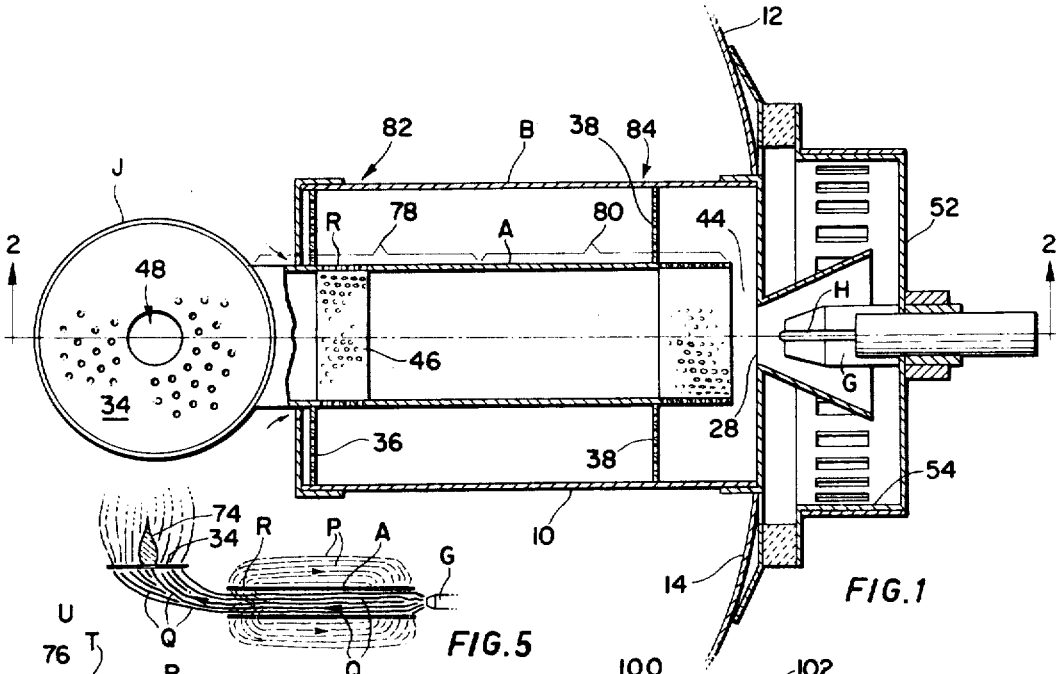
FIG. 1
FIG. 5
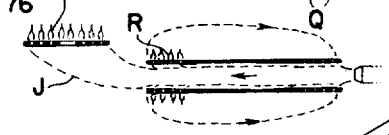
FIG. 6
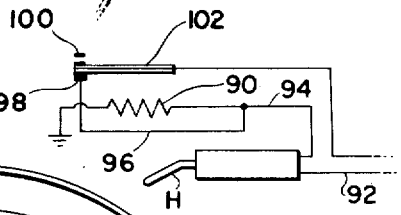
FIG. 7
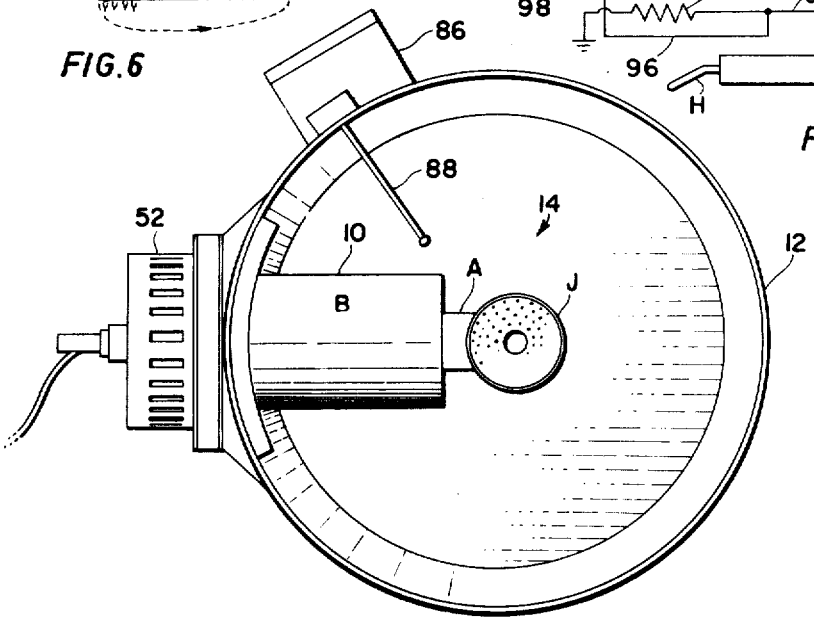
FIG. 4
Inventor
EDGAR C. ROBINSON
by: Cecil C. Kent Attorney Inventor

EDGAR C. ROBINSON by: Cecil C. Kent Attorney

BURNERS

Matter enclosed in heavy brackets [ ] appears in the original patent but forms no part of this reissue specification; matter printed in italics indicates the additions made by reissue.

BACKGROUND OF THE INVENTION

The present invention relates to oil burners suitable for use in heating installations of various kinds but particularly for those intended for use in association with domestic heating units and especially domestic hot water heating units.

Oil-burning hot-water heaters of the type used in many households are unable to operate efficiently due in part to the design of the burners thereof and partly because the oil and air which provides the combustible mixture are both fed to such burners under considerable pressure. The combustion chambers of most domestic burners are considerably smaller than those of commercial hot water heaters for example. As a result of these considerations fuel tends to be swept through these chambers before it can be preheated and mixed thoroughly as is necessary if a high rate of heat release is to be achieved. A high-pressure burner requires that the combustion chamber associated therewith be lined with a refractory material, and to sustain combustion this material must be incandescent. However since the demand for hot water is not great or frequent, such burners only operate at fairly widely spaced intervals and then usually for only a short period of time. Accordingly, at each time of use the burner should be brought up to an operating temperature which will permit the fuel to burn properly. But length warmup further reduces the effectiveness of such burners because in fact the surrounding refractory material is not brought up properly to incandescence each time and as a result, conventional hot water heating equipment and especially conventional domestic hot-water heating equipment operates considerably below optimum efficiency from the standpoint of economy as well as from the standpoint of frequency of maintenance which is required to keep an inefficient burner clean.

BRIEF SUMMARY OF THE INVENTION

The invention consists of means for accomplishing the method steps which are characterized by initially projecting a relatively long jet or tongue of flame from ignited fuel longitudinally from an injecting nozzle assembly to a principal burning zone which is remote therefrom and well within (usually substantially centrally within) a surrounding axially vertical combustion chamber. Simultaneously with what has just been stated, a counterflow of a part of said jet or tongue is caused to travel oppositely or back toward the general region from whence the flame emerges from the nozzle assembly, the counterflowing part returning somewhat as might a fountain having a ring of jets around a central jet, or as petals might droop from a flower except that the flow here being referred to is horizontal. The originating location of the counterflow is between the nozzle assembly or source of flame and the aforesaid principal burning zone. The counterflow is reintroduced back into the main central jet or tongue near the said source or nozzle assembly.

The next step in the accomplishment of the present invention is that of separating the tongue of flame from the nozzle when a sufficient rise in ambient temperature has supervened. This separation and extinguishment of the flame tongue is caused by the turning off of the ignition electrode adjacent the aforesaid nozzle. In the action of extinguishment the flame leaves the vicinity of the nozzle assembly travelling the full length of the burner to appear in the form of a multiplicity of clean blue uniform flame jets at the mentioned principal burning zone. At the same time a band of similar clear blue flame jets appears at the originating location of counterflow. The principal burning zone is further from the nozzle assembly than the originating location of counterflow. While the aforesaid main tongue of flame travels horizontally, the firstmentioned multiplicity of blue flame jets are projected vertically upwards within the combustion chamber. In the conclusion, in this context, it will accordingly be recognized that there is visible within the combustion chamber from the outside thereof after the burner has been brought up to optimum oil vaporizing heat, only the horizontal upwardly facing disc of blue flame jets.

The novel objects achieved by the burner structure which produces the above forms of visible heat may be stated as follows:

The burner is designed for consuming any fuel from kerosene to Type 2 furnace oil without adjustment. At this point another particular novel feature of the burner may be stated as residing in the fact that it operates at atmospheric pressure and requires no forced draft, the only point at which a small quantity of air under pressure is admitted to the burner being at the injection nozzle assembly thereof where such pressure is in the order of up to 10 p.s.i. as a rule, this being substantially solely for the purpose of breaking up and impelling particles of oil mixed with air into the burner at the point where the fuel is ignited.

A novel advantage flowing from the last aforementioned objective lies in the fact that such a burner both starts up and operates at sound levels which are low and comparable to existing gas fired units which are well known to have acoustic advantages. At the same time, due to its high recovery rate the present burner would appear to be favorably competitive with gas in terms of consumption costs.

A further novel objective achieved by the present burner and also flowing from what has already been stated resides in that operation at atmospheric pressure, or in other words, with natural draft, eliminates one of the biggest service problems which is that of the 'linting up' of oil burners. By this is meant the accumulation of dust and lint upon the fan blades of a forced draft blower, also the accumulation of such materials upon the parts surrounding and adjacent the fan whereby the area of air entry into the burner is diminished, and also the charring of the burner orifices with lint mixed with incompletely burned oil due to the slowing down of the fan blades consequent upon the deposit of said lint thereon whereby the air intake capacity is decreased and hence the combustibility of fuel within the burner.

A yet further novel feature of the present burner arising out of its quietness of running is its suitability for oil-burning use (particularly when the burner plates are made rectangular instead of circular as herein) in association with clamshell heat exchangers as used in automobile trailers, cabin cruisers and the like, which are extremely easy to manufacture and assemble, and are relatively deep, wide, cross-sectionally narrow, and more or less corrugated being fomed of two similar stampings edge joined and between which the burner is placed usually in multiples of three.

*A further important novel object is the provision of means for feeding separate air to the initial mixing zone between the burner tube and fuel nozzle, and to the combustion chamber so that the two main bodies of combustion supporting air may be "balanced" according to atmospheric conditions. These means essentially embody an air distributing housing secured against the combustion chamber wall so as to cover and enclose both the air passages to said mixing zone and said combustion chamber within a common plenum, the said air passages thus being served from one air body inside the distributor housing, all to the end of maintaining as nearly as possible a substantially constant volumetric intake of air into the burner tube regardless of the air pressure (i.e., barometric conditions) in the combustion chamber surrounding the burner so that, in turn, a hot blue flame will be maintained at the burner head substantially regardless of barometric combustion chamber variations.*

A further objective achieved by the burner consists of efficiencies in the order of 84 percent combined with the employment of a burning process which is nearly perfect, the combustion gases containing only traces of CO and no visible smoke or soot. As a result, the low stack temperature achieved can be advanced to the authorities concerned in favor of permitting the main chimney for such a burner to employ type "B" vents as presently allowed for gas-fired units only.

A further object is to vaporize a tongue of fuel within an inner burner type by a surrounding counterflow to provide means for preventing it from becoming reignited.

Further objectives attained by the present burner reside in the design and arrangement of the same which renders it easily adaptable to replacement of existing oil-fired burners, quick and easy withdrawal of the unit for maintenance purposes and consequent reduction in maintenance costs, fewness of moving parts thus further simplifying servicing due to wear-out, the provision of a nozzle the exit orifice of which is very considerably larger than with conventional burners resulting in a relatively cool nozzle temperature and the elimination of plugging by dirt and hence carbon buildup while at the same time providing a nozzle assembly which is located externally of the fuel combustion chamber and hence away from the high-temperature zone with its quickly deteriorating effect upon a nozzle, and the production of a flame which does not need a refractory or stainless steel combustion chamber hence resulting in reduced weight, price and maintenance.

Further novel objectives reside in that the purchaser is not obliged to outlay the expense of a fan or blower and in that a useful space saving is achieved particularly in small housing units due to the elimination of a fan or blower and associated motor for operating the same.

With the foregoing in view, and such other or further purposes, advantages or novel features as may become apparent from consideration of this disclosure and specification, the present invention consists of the inventive concept which is comprised, embodied, embraced, or included in the method, process, construction, composition, arrangement or combination of parts, or new use of any of the foregoing, herein exemplified in one or more specific embodiments of such concept, reference being had to the accompanying Figures in which:

FIG. 1 is a plan representation of the invented oil burner.

FIG. 4 is a plan representation for the purpose of orientating and depicting in situ the invented oil burner in and with respect to an enclosing combustion chamber.

FIG. 5 is a representation of the flame travel immediately following startup.

FIG. 6 is a representation similar to FIG. 5 some 60 to 90 seconds after startup.

FIG. 7 is a circuit detail showing an example of a means for causing the flame tongue to be extinguished when a sufficient rise in ambient temperature is supervened.

In the drawings like characters of reference designate similar parts in the several Figures.

PRELIMINARY DESCRIPTION

Stated in terms generally consonant with those of the accompany claim or claims to aid in construing the same the invention includes an inner burner tube A, a surrounding jacket B, said tube and jacket each having first ends C and D respectively, and adjacent second ends E and F respectively, said jacket being spaced from said tube, a fuel nozzle assembly G, and an ignition electrode H characterized by including (i) a burner head J on the first end of said tube, (ii) means in the form of a first end wall K (the second end wall being L), the multi-apertured first and second annular bands M and N, and the tube and jacket A and B respectively defining the surrounding counterflow chamber O, for providing a counterflow of ignited fuel P (FIG. 5) through said counterflow chamber O, said counterflow P being opposite in direction to the flow, and consisting of a portion of, a tongue Q of flammable fluid projected through tube A from nozzle assembly G, (iii) the original location R of the aforesaid counterflow being between the said nozzle assembly and the said burner head, (iv) means comprising in combination the aforesaid second band N and the annular space S for reintroducing counterflow P back into inner tube A, and (v) means consisting of a thermostatic cutout for causing flame tongue Q to be extinguished when a sufficient rise in ambient temperature has supervened, and simultaneously therewith thereby causing the generation of a blue flame T at originating location R and at a principal burning zone U, said burning zone being further from nozzle assembly G than originating location of counterflow R. *Burner tube A encloses a fuel chamber V. Arranged closely around jacket B are air intake apertures X. Covering and enclosing the pathways of ambient air into both the air and fuel mixing funnel of assembly G and the said apertures X is a variable air distributing housing Y.*

DETAILED DESCRIPTION

The burner collectively designated 10 is secured to the wall 12 of the surrounding conventional combustion chamber 14 so as to project horizontally into the combustion chamber.

Figure 2:
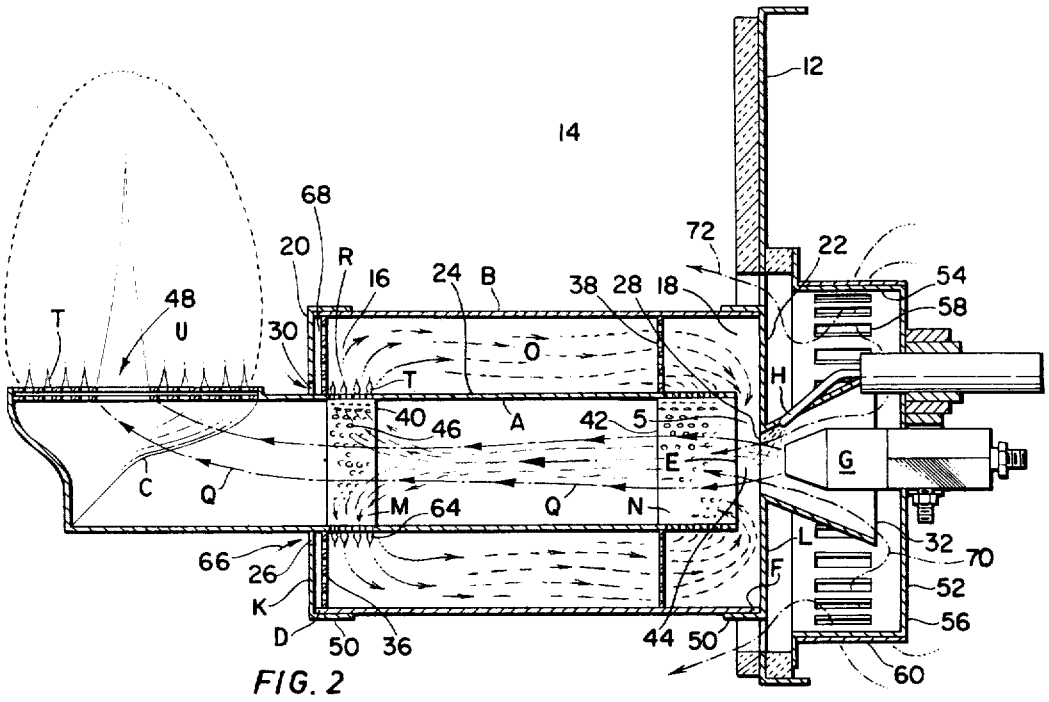
FIG. 2 is a sectional elevation substantially on the line 2—2 of FIG. 1.

The burner per se comprises, in combination with the aforesaid inner burner tube A, surrounding jacket B, wherein the jacket is spaced from the tube, a fuel nozzle assembly G and an ignition electrode H when characterized by including the following features:

A first end generally designated 16 and a second end generally designated 18, the first end having an imperforate end wall 20 and the second having an imperforate second end wall 22. These end walls, together with the jacket B, and the portion 24 of tube A which is between said end walls define the aforesaid counterflow chamber O which is best seen from FIG. 2 to be relatively elongated and of annular configuration.

Although it has been said that the end walls 20 and 22 are imperforate, they are nevertheless provided with the central apertures 26 and 28 respectively, through the former of which tube A extends, and with sufficient clearance, centrally of said aperture as to provide *what is collectively designated as* an annular combustion supporting structure 30. Second end wall 22 is centrally apertured at 28 to provide an intake orifice for the elongated flame tongue Q, a frustoconical funnel 32 being secured to the perimeter of aperture 28 upon the external side of chamber 14 to accommodate ignition assembly G and electrode H.

Burner head J is in the form of an outflared and rimmed formation or somewhat circular washbasin shaped. Spanning the rim thereof is a pair of slightly spaced multiapertured fuel jet plates 34. Burner tube A is held centered within jacket B by two discoid rings, one of which is styled an apertured air distributor 36 slightly spaced from plate 20 within chamber O. The other is a flame arrestor plate 38, secured to tube A and jacket B as clearly depicted to prevent reignition of the flame of tongue Q after it has been extinguished and vaporized as will hereinafter be explained.

Figure 3:
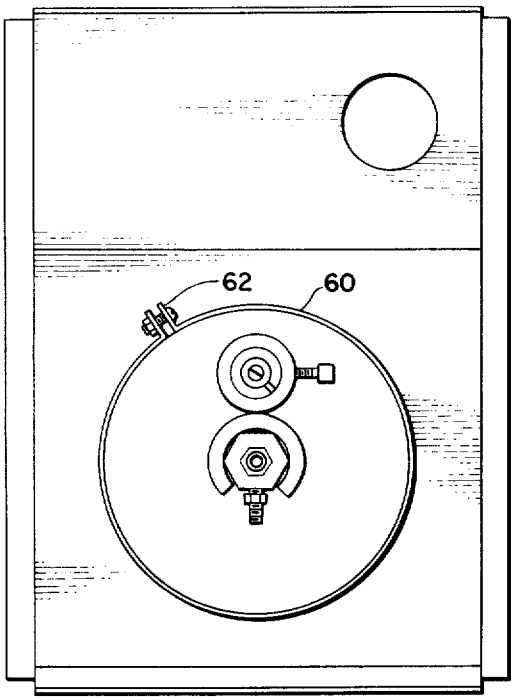
FIG. 3 is an end elevation as viewed from the right of FIG. 2.

Communication between inner tube A and counterflow chamber O is provided by means of a first annular band 40, a second annular band 42, and an annular space 44. Both annular bands are multiapertured, said apertures being designated 46. Annular space 44 is located between the second end D and second end wall L. A pair of aligned central and relatively enlarged apertures 48 are provided in jet plates 34. Flanges 50 overlap the opposite ends of jacket B (which is for all practical purposes coincident with combustion chamber wall 12). Secured upon the external side of said wall (in other words to the right of said wall as appears from FIG. 2) are adjustable *air distributing* means collectively designated 52 (*including the housing Y*) for [ varying the admission of ] *a* combustion supporting air *stream which flows simultaneously and according to demand through the funnel 32 and apertures X* to the interior of tube A and the surrounding combustion chamber 14 *respectively*. These means consist of an annular outwardly projecting wall 54 and end plate 56. Wall 54 is provided with a set of spaced *air* apertures 58. Overlying wall 54 is a ring 60 provided with apertures of the same size as apertures 58 and capable of registration or partial registration therewith upon rotation of the ring which is normally held clamped to wall 54 by means of the conventional nut and bolt bracket assembly collectively designated 62 (FIG. 3).

OPERATION

Upon operation of the associated pump (not shown) air therefrom at 4 to 7 p.s.i. enters nozzle assembly G where it creates a partial vacuum thereby attracting oil from the associated oil pump, (also not shown) to be mixed with said air and expelled through the orifice 28. Approximately on the plane of such orifice electrode H ignites the oil and air mixture to create a long luminous tongue flame commencing substantially at the nozzle orifice and extending clear through burner tube A and through burner head J. At the same time an outer annular layer of the tongue of flame is so to say stripped off and proceeds through first annular band 40 into the original location of the commencement of counterflow R it counterflows through chamber O oppositely back through flame arrestor plate 38, annularly or radially inwards through second apertured annular band 42 as well as through annular space S to recirculate again toward burner head J within burner tube A.

The just-stated process continues for some 60 to 90 seconds. At that time ignition electrode H is automatically inactivated. This causes the flame of the tongue Q to be extinguished since it is to be understood that under normal operating conditions after some 60 to 90 seconds a sufficient rise in ambient temperature has supervened to vaporize the air and oil mixture expelled from orifice G. At the same time as electrode H is inactivated, a multiplicity of small blue jets of flame 64 are established on the outer surface of first annular band 40 as a result of the intake of [ fresh ] air as indicated by arrow 66 [ around the annular combustion supporting ] *through* aperture [ 30 ] *26*. Such intake of air is also distributed in the narrow annular space 68 between the otherwise imperforate end plate 20 and perforated distributor ring 36 [ Thus ] , *thus* assisting the completion of combustion not only at the location R but usefully throughout the entire adjacent region of counterflow chamber O and to some extent through the entire chamber.

It is to be understood that by this time the temperature of the burner has reached a point where the air and oil mixture is immediately vaporized into a gas upon entry past orifice 28. The kinetic energy of the nozzle assembly G also draws air as indicated at 70 through apertures 58 into funnel 32 to mix with the air oil mixture. In addition, combustion supporting air also enters through said apertures 58 as indicated at 72 for the purpose of aiding the completion of combustion within chamber 14. *As a result, combustion-supporting input air in the form of what is herein designated as primary and secondary air streams 72 and 70 respectively entering the right or second end (with respect to FIG. 2) is "balanced across the burner" so that if for example high barometric stack pressure is obtaining, more air is admitted to 14 but less to burner tube A so as not to change the character of flame, such as would happen if air were admitted to the tube A proportionately with an increase in negative pressure. It will be noted by best reference to FIG. 2 and the shown openings X and 28 therein that the said primary and secondary air streams 70 and 72 are separate from each other. The intake at aperture 26 may for convenience be referred to as a tertiary air stream.*

*If the burner has been preset for example so as to provide a hot blue flame at or about normal ambient barometric pressure, the performance of the air distributing means 52 in the achievement of its object, namely the maintenance of such a flame regardless of ambient barometric variation can be described as follows:*

*Let it be assumed that there is .02 inches of water column negative in combustion chamber 14. Air enters Y through ports 58 and then divides into the primary stream 72 to enter 14 through aperture X, and secondary*

*stream 70 to enter the burner tube A by way of funnel 32.*

*Since the two air streams 70 and 72 are separate, substantially the only draw upon 70 is that caused by the aspirating effect of the nozzle assembly G which is invariant. If therefore the barometric pressure in combustion chamber 14 be increased to 0.08 WC negative there is an immediate increase in demand upon the air within the distributing housing Y. This is satisfied by an increase of air stream 72 through apertures X at the expense of air stream 70 which is slightly reduced due to the creation of a small pressure drop between the intake of funnel 32 and the adjacent end plate or wall 56. Thus the combustion air entering housing X due to being split into two streams which are separate, and led, the one to the combustion chamber 14 and the other to the burner tube, is automatically balanced resulting in a substantially constant blue flame. This condition would not obtain if the combustion chamber air intake 72 and the burner tube intake 32 each communicated separately directly with the surrounding air. In that case by contrast there would be an equal pressure draw into the combustion chamber and into the burner tube. Such draw in the case of air stream 70 would be mainly through the burner plate orifices detrimentally changing the character of the flame T.*

During the first 60 to 90 seconds of operation while the flame Q is luminous it will be understood that it is luminous flame which also counterflows in chamber O and which proceeds onwardly to and through jet plates 34 including the central spire of flame 74. When vaporizing heat has been achieved, the tongue Q is in the form of a gas and it is as a gas that the fuel counterflows backwardly through chamber O as indicated in FIG. 6. Thus it will be understood that all that is visible when vaporizing or gasifying heat has been achieved is a ring of blue flame jets T, and an upper facing disc of such jets at the principal burning zone generally designated 76, such disc being horizontal in virtue of the generally right-angular disposition of the inner burner tube to the head J.

When the burner is up to vaporizing heat, the maximum temperatures tested on the upper plate 34 have been 1,100°–1,200° F. However the normal operating temperatures, reached in 2 to 3 minutes at this place are 700°–800° F. Between approximately the limits of bracket 78 (FIG. 1) maximum recorded temperatures have been 1,200°–1,400° F. and between approximately the limits of bracket 80 they have been 1,200–1,400°C F. However, the normal operating temperature approximately between the limits of brackets 78 and 80 are 850°–1,000° F. and 1,000°–1,100° F. respectively and reached in 2 to 3 minutes as aforesaid. In the regions of the arrows 82 and 84, on the surface of jacket B maximum recorded temperatures have been 1,100°–1,200° F. and 900°–1,000° F. respectively, and after 2 to 3 minutes, normal temperatures at these two regions are approximately 900°–1,000° F. and 700°–800° F. respectively.

From all the foregoing it will now be recognized that the invented oil burner is a low-pressure air-aspirating and atomizing burner. Fuel oil is drawn through the inlet valve of an associated gear-type oil pump and discharged into the float chamber thereof, which float chamber contains a float-operated oil return control valve. From this float chamber a zero pressure regulator is fitted to the nozzle assembly supply line. A vane-type air pump driven by an electric motor common to the oil pump provides air at a pressure of approximately 6 p.s.i. to the nozzle. Oil is lifted to the nozzle mixing zone by the aspirating action of the atomizing primary air. As already stated a relatively large nozzle is employed. The primary air-oil mixture passes through a horizontal preheating and vaporizing zone being that which has already been described in detail and illustrated in the accompanying drawings before being deflected by a 90° elbow (the angulation between A and J) to discharge across a diffuser plate, or as heretofore designated, the plates 34 where it is ignited. [ Secondary combustion air ] *The tertiary air stream 66* is drawn in concentrically at the aperture [ 30 ] *26* as also already described, about the burner tube A to counterflow chamber O.

In tests, two water heaters fired by the described burner were employed. Efficiency was determined using the indirect method, namely by establishing an analysis of the flue gases. The apparatus used was the standard Orsat apparatus capable of measuring the $CO_2$, CO and oxygen in flue gases to a volumetric accuracy of better than 0.2 percent.

Since the Orsat apparatus could not indicate CO of less than 0.1 percent by volume or about 1,000 p.p.m. a more accurate check using Bacharach Industrial Instrument Co. CO Tester was carried out. The results of testing indicated only traces of CO, in the order of 1 p.p.m.

The fuel used was standard Esso Furnace Oil ASTM Specification D-306 Grade No. 2 distillate fuel.

For each of the two heaters tested the apparent variation in efficiency was found to be well within the possible errors involved in measurement and computation of such efficiency. The variation was less than one-half of 1 percent from the average. The average efficiency computed for heater No. 1 was 83.8 percent and for heater No. 2 was 83.04 percent. Combustion was found to be complete and evidenced by the practically imperceptible traces of CO in the exhaust gases. The gases expelled are $CO_2$ and water vapor with traces of $SO_2$ and $SO_3$ depending on the fuel used. The exhaust gases also were clear and contained no visible smoke or sooty deposits. Here follows the results of the flue gas analysis and the evaluated efficiencies in respect of heater No. 2:

| Test Number | 11:04 (d) | 11:15 1 | 11:30 2 | 13:05 3 | 13:30 4 |
|---|---|---|---|---|---|
| Flue gas analysis; (e) percent | | | | | |
| $CO_2$ | | 10.6 | 10.2 | 10.4 | 0.8 |
| $O_2$ | | 6.8 | 7.8 | 8.2 | 7.8 |
| CO | | <0.1 | <0.1 | <0.1 | <0.1 |
| Temperatures °F. | | | | | |
| Ambient | (1) | 70 | 72 | 77 | 73 |
| Stack | (1) | 390 | 390 | 400 | 400 |
| Water in | (1) | 46 | 46 | 46 | 46 |
| Water out | (1) | — | 140 | 140 | 142 |
| Excess air percent | (1) | 45.3 | 56.3 | 61.7 | 55.9 |
| Flue gas loss percent | (1) | 8.34 | 8.52 | 8.53 | 9.07 |
| Comb. $H_2O$ loss percent | (1) | 7.20 | 7.19 | 7.19 | 7.21 |

-continued

| Test Number | 11:04 (d) | 11:15 1 | 11:30 2 | 13:05 3 | 13:30 4 |
|---|---|---|---|---|---|
| Air $H_2O$ loss percent | (1) | 0.14 | 0.15 | 0.15 | 0.15 |
| Other loss percent (a) | (1) | 1.0 | 1.0 | 1.0 | 1.0 |
| Calculated efficiency percent | | 83.32 | 83.14 | 83.13 | 82.57 |
| Average efficiency | | 83.04 | 83.04 | 83.04 | 83.04 |

[1]Start up of second unit.

In the above table (a) means other loss taken as radiation plus unaccounted for loss, assumed at 1 percent: (d) heater run continuously from startup. Water flow approximately 3.75 lb./minute: (e) Orsat Apparatus accuracy better than 0.2 percent volumetric.

Reverting in conclusion to the burner as exemplified, there is shown in FIG. 7 a means for causing the flame of tongue Q to be extinguished when a sufficient rise in ambient temperature has supervened. The circuitry shown is purely exemplary and not that which is actually used since the circuitry actually used is considerably complicated beyond what has herein been shown having regard for other purposes such as demand startup, safety controls and the like common to oil burner installations. The circuitry of FIG. 7 is however sufficient to indicate a means for the precise purpose just stated and it is to be understood that the same will be housed within the control box 86 from which, or adjacently from which projects a conventional probe 88 which could also be adapted for use as the means for causing the flame of the tongue to be extinguished under the circumstances just mentioned, both the utilization of the probe for such a purpose and the circuit of FIG. 7 being well within the skill of those versed in the art to which this invention pertains.

With the foregoing understood, a grounded heater coil 90 is provided on one side of the electrode circuit 92, as an element in the series circuit 94. A shunt 96 to one of a pair of terminals 98 and 100 is located in the shunt circuit 96. A bimetallic strip thermostat 102 is connected in the circuit 94. When the heater coil deflects the thermostat from the position shown and out of contact with terminal 98, circuit 92 is interrupted and the electrode H inactivated. As a consequence the visible tongue of flame is quenched in favour of the condition which has already been fully described herein.

Various modifications can be made within the scope of the inventive concept disclosed. Accordingly, it is intended that what is set forth herein should be regarded as illustrative of such concept and not for the purpose of limiting protection to any particular embodiment thereof, and that only such limitations should be placed upon the scope of protection to which the [ inventor hereof ] *patentee* is entitled as justice dictates.

What is claimed is:

1. In the art of combusting flammable fluid fuel for creating heated gas, the method steps which are characterized by:

i. initially projecting a relatively long tongue of ignited fuel longitudinally from a source to a principal burning zone remote from said source, ii. causing an opposite, counterflow of a part of said tongue back towards said source, the originating location of said counterflow being between said source and said principal burning zone, iii. reintroducing said counterflow back into said tongue near said source, iv. causing the flame of said tongue to be extinguished when a sufficient rise in ambient temperature has supervened, and substantially simultaneously therewith v. causing the generation of a blue flame at the said originating location of counterflow, and at said principal burning zone, and vi. introducing sufficient air to [ meet the requirements aforesaid, said burning zone being further from said source than said original location of counterflow. ] *said burner to support combustion.*

2. The method according to claim 1 which includes the step of admitting additional counterflow air to mix with said first mentioned counterflow.

[ 3. The method according to claim 1 which is effected within a surrounding combustion chamber and which includes the steps of:

i. admitting additional counterflow air to mix with said first mentioned counterflow, and ii. admitting air to said combustion chamber from a location near said source to mix with said tongue of ignited fuel within said combustion chamber. ]

[ 4. A fluid fuel burner embodying an inner burner tube, a surrounding jacket, said tube and said jacket each having a first end and adjacent second ends, said jacket being spaced from said tube, a fuel nozzle assembly, an ignition electrode and sufficient air intake means, the foregoing being characterized by including:

i. a burner head, on the first end of said tube, ii. means for providing a counterflow of ignited fuel through a counterflow chamber existing between and by virtue of said tube and said jacket, said counterflow being opposite in direction to the flow of, and consisting of a portion of, a tongue of flammable fluid projecting through said tube from said nozzle assembly iii. the originating location of said counterflow being between said nozzle assembly and said burner head iv. means for reintroducing said counterflow back into said inner tube near said nozzle assembly, and v. means for causing the flame of said tongue to be extinguished when a sufficient rise in ambient temperature has supervened, and substantially simultaneously therewith thereby causing the generation of a blue flame at the said originating location of counterflow, and at a principal burning zone, said burning zone being further from said nozzle assembly than said originating location of counterflow. ]

5. A fluid fuel burner [embodying] *including in combination with* an inner burner tube, a surrounding jacket, said tube and jacket each having a first end and adjacent second ends said jacket being spaced from said tube, a fuel nozzle assembly, an ignition electrode and [ sufficient ] *combustion supporting* air intake means [, the foregoing being characterized by including ] :

i. a burner head [ on ] *at* the first end of said tube ii. first and second end walls for said jacket providing a counterflow chamber therebetween surrounding said inner tube, said inner tube admitting fuel at said second end and discharging it at said first end, iii. said second wall extending between said jacket and inner tube adjacent said nozzle assembly

[iv. said inner tube being vented to an external side of said chamber at the first end of said jacket,]

v. said first end wall being predominantly imperforate but [ sufficiently apertured as to permit ] *having aperture means for permitting* a limited volume of counterflow air into said surrounding *counterflow* chamber, vi. said inner tube being of greater length than said jacket and projecting through an aperture provided therefor in said first end wall, vii. said inner tube providing communication with said chamber adjacent both said end walls for the counterflow *from* and reintroduction [ respectively ] , to said inner tube of products of combustion burnt within said inner tube, viii. said burner head being upon the first end portion of said inner tube which end projects through said first end wall to said external side of said *counterflow* chamber.

6. The invention according to claim 5 in which said communication between said inner tube and said *counterflow* chamber adjacent the first end wall thereof is in the form of an annular band comprised of a multiplicity of apertures in said inner tube.

7. The invention according to claim 6 in which said communication between said inner tube and said *counterflow* chamber adjacent the second end wall thereof includes an annular space between the second end of said tube and said second end wall.

[ 8. The invention according to claim 6 in which said communication between said inner tube and said chamber adjacent the second end wall thereof is in the form of an annular band comprised of a multiplicity of apertures in said inner tube.]

[ 9. The invention according to claim 8 in which said communication between said inner tube and said chamber adjacent the second end wall thereof also includes an annular space between the adjacent end of said tube and said second end wall.]

10. The invention according to claim [9] *7* which is also characterized by the provision of an air intake aperture in said second wall, a frustoconical funnel secured to the rim of said aperture substantially on the vertex plane thereof, said fuel nozzle assembly [ and said ignition electrode ] projecting into said funnel.

11. The invention according to claim 10 in which said burner is secured to and projects inwardly from the wall of a combustion chamber, and [ adjustable ] *air distributing* means on the external side of said wall for [ varying the admission ] *balancing the volume* of combustion supporting air [to] *between* the interior of said combustion chamber and [into] *the vicinity of* said [ funnel through venting ] *combustion tube through aperturing in said funnel and* in said wall upon the outer side of said jacket [ . ] , *all said aperturing being within the confines of said distributing means.*

12. The invention according to claim 5 which is also characterized by including a multiapertured air-distributing plate on the counterflow chamber side of said first end wall, slightly spaced therefrom.

13. The invention according to claim [ 9 ] *7* which is also characterized by including a multiapertured air-distributing plate on the counterflow chamber side of said first end wall, and slightly spaced therefrom.

14. The invention according to claim 5 in which said burner head is characterized by being secured to the fuel discharge end of said inner tube, said head being in the form of an outflared and rimmed head formation, and at least one multiapertured fuel jet plate spanning said rim.

15. The invention according to claim [10] *7 which is also characterized by the provision of an air intake operature in said second wall, a frusto-conical funnel secured to the rim of said operature substantially on the vertex plain thereof, said fuel nozzle assembly and said ignition electrode projecting into said funnel and* in which said burner head is characterized by being secured to the first end of said inner tube, said head being in the form of an outflared and rimmed head formation and at least one multiapertured fuel jet plate spanning said rim.

16. The invention according to claim 5 in which said burner head is characterized by being secured to the first end of said inner tube, said head being in the form of an outflared and rimmed head portion, and a pair of closely spaced and parallel, multiapertured fuel jet plates spanning said rim, said burner in situ being axially horizontal with said inner tube horizontal and said burner head generally right-angularly disposed with said inner tube axis so that said head formation opens upwardly with the rim thereof lying in a horizontal plane.

17. The invention according to claim [10] *15* in which said burner head is characterized by being secured to the first end of said inner tube, said head being in the form of an outflared and rimmed head portion, and a pair of closely spaced and parallel multiapertured fuel jet plates.

18. The invention according to claim 6 which is also characterized by including a multiapertured air-distributing plate on the counterflow chamber side of said first end wall, and slightly spaced therefrom.

19. The invention according to claim 6 in which said communication between said inner tube and said chamber adjacent the second end wall thereof includes an annular space between the adjacent end of said tube and said second end wall.

20. The invention according to claim 19 in which said burner is secured to and projects inwardly from the wall of, a combustion chamber, and [adjustable] *air distributing* means on the external side of said wall for [ varying the admission ] *admitting variable volumes* of combustion supporting air *and distributing said air separately to the vicinity of the second end of said inner burner tube and* to the interior of said combustion chamber [ and into said counterflow chamber. ] .

21. The invention according to claim [ 3 ] *1 which is effected within a surrounding combustion chamber and which includes the steps of:*

*admitting additional counterflow air to mix with said first mentioned counterflow, and*

*admitting air to said combustion chamber from a location near said source to mix with said tongue of ignited fuel within said combustion chamber, and* which includes the step of preventing the reignition of said tongue by said counterflow after it has been vaporized by said temperature rise and extinguished.

22. [ The invention according to claim 4 which includes ] *A fluid fuel burner embodying an inner burner*

*tube, a surrounding jacket, said tube and said jacket each having a first end and adjacent second ends, said jacket being spaced from said tube, a fuel nozzle assembly, an ignition electrode and combustion supporting air intake means, and including in combination:*

*i. a burner head, on the first end of said tube*

*ii. means for providing a counterflow of ignited fuel through a counterflow chamber existing between said tube and said jacket, said counterflow being opposite in direction to the flow of, and consisting of a portion of, a tongue of flammable fluid projecting through said tube from said nozzle assembly,*

*iii. the originating location of said counterflow being between said nozzle assembly and said burner head,*

*iv. means for reintroducing said counterflow back into said inner tube near said nozzle assembly, and*

*v. means for causing the flame of said tongue to be extinguished when a sufficient rise in ambient temperature has supervened, and substantially simultaneously therewith thereby causing the generation of a blue flame at the said originating location of counterflow, and at said burner head, and*

*vi.* means for preventing the reignition of said tongue by said counterflow after it has been vaporized by said temperature rise and extinguished.

23. The invention according to claim 5 which includes flame arrestor means in said counterflow chamber for preventing the reignition of said tongue by said reintroduced products of combustion after said tongue has been vaporized by said temperature rise and extinguished.

24. The invention according to claim 12 which includes an annular apertured flame arrestor plate spanning said counterflow chamber between said tube and said jacket, said plate being relatively near the second ends of said tube and jacket, said plate preventing the reignition of said tongue by said counterflow after [ it ] *said tongue* has been vaporized by said temperature rise and extinguished.

*25. For use in combination with a burner tube adapted and designed to project into a combustion chamber from the enclosure defining said chamber, air distributing means on the exterior side of said enclosure, said distributing means being apertured for air admission and communication with:*

*a. the interior of said burner tube,*

*b. said combustion chamber, means for automatically, separately, and simultaneously feeding air into said tube and into said combustion chamber according to the relative barometric demands of said tube and combustion chamber, and means for isolating the proportion of air fed into said combustion chamber against entry into said burner tube at least in the vicinity of said location from which said burner tube projects into said combustion chamber;*

*said air distributing means being secured to and projecting outwardly from said enclosure, said enclosure being apertured within the confines of said housing so as to be enclosed thereby and permit the passage of air within said distribution housing therethrough into said combustion chamber.*

*26. The invention according to claim 25 which includes a venturi funnel for a fuel nozzle positioned in said distributing housing, said funnel being secured and substantially sealed around its reduced discharge end against air admission other than through the enlarged intake end thereof, said funnel being substantially co-axial with said tube.*

*27. The invention according to claim 26 in which said funnel is situated substantially central of said distributing housing the aperturing in said enclosure being arranged about said funnel and spaced therefrom.*

*28. The invention according to claim 27 in which said air intake housing includes a surrounding apertured wall secured against and projecting outwardly from said enclosure and an end plate spanning said apertured wall, a plenum chamber occupying the space between said apertured wall, said end plate, and the portion of said combustion chamber enclosure bounded by said apertured wall.*

*29. The invention according to claim 22 in which said burner projects into a combustion chamber from a location at least near to a portion of the enclosure defining said chamber, air distributing means on the exterior side of said enclosure, said distributing means being apertured for air admission thereto and air communication with:*

*a. the interior of said burner tube,*

*b. said combustion chamber,*

*means for automatically, separately, and simultaneously feeding air into said tube and into said combustion chamber from said air distributing means according to the barometric demands of said combustion chamber, and means for isolating the proportion of air fed into said combustion chamber against entry into said burner tube at least in the vicinity of said location from which said burner tube projects into said combustion chamber.*

*30. The invention according to claim 5 in which said burner projects into a combustion chamber from a location at least near to a portion of the enclosure defining said chamber, air distributing means on the exterior side of said enclosure, said distributing means being apertured for air admission and communication with:*

*a. the interior of said burner tube,*

*b. said combustion chamber,*

*means for automatically, separately, and simultaneously feeding air into said tube and into said combustion chamber from said air distributing means according to the barometric demands of said combustion chamber, and means for isolating the proportion of air fed into said combustion chamber against entry into said burner tube at least in the vicinity of said location from which said burner tube projects into said combustion chamber.*

*31. The invention according to claim 7 in which said burner projects into a combustion chamber from a location at least near to a portion of the enclosure defining said chamber, air distributing means on the exterior side of said enclosure, said distributing means being apertured for air admission and communication with:*

*a. the interior of said burner tube,*

*b. said combustion chamber,*

*means for automatically, separately, and simultaneously feeding air into said tube and into said combustion chamber according to the barometric demands of said combustion chamber, and means for isolating the proportion of air fed into said combustion chamber against entry into said burner tube at least in the vicinity of said location from which said burner tube projects into said combustion chamber.*

*32. The invention according to claim 22 in which said burner projects into a combustion chamber from a location at least near to a portion of the enclosure defining said chamber, air distributing means on the exterior side of said enclosure, said air distributing means being apertured for air admission and communication with:*

*a. the interior of said burner, and*

*b. said combustion chamber,*

*means for automatically, separately, and simultaneously feeding air into said tube and into said combustion chamber according to the barometric demands of said combustion chamber, and means for isolating the proportion of air fed into said combustion chamber against entry into said burner tube at least in the vicinity of said location from which said burner tube projects into said combustion chamber, said air distributing means being in the form of an apertured air intake housing secured to and projecting outwardly from said enclosure, said enclosure being apertured within the confines of said housing to permit the passage of air within said distribution housing therethrough into said combustion chamber, said burner tube lying within the produced boundary of said housing, a venturi channel for a fuel nozzle positioned in said distributing housing, the reduced end of said funnel lying substantially on the plane of said enclosure, said funnel being secured on said plane and substantially sealed around its reduced discharge end against air passage other than through the enlarged intake end thereof, said funnel being substantially co-axial with said tube, said funnel being situated substantially central of said distributing housing, the aperturing in said enclosure being arranged about said funnel and spaced therefrom, said air intake housing including a surrounding apertured wall projecting outwardly from said enclosure and an end plate spanning said apertured wall, a plenum chamber occupying the space between said apertured wall, said end plate, and the portion of said combustion chamber enclosure bounded by said apertured wall.*

*33. The invention according to claim 5 in which said burner projects into a combustion chamber from a location at least near to a portion of the enclosure defining said chamber, air distributing means on the exterior side of said enclosure, said air distributing means being apertured for air admission and communication with:*

*a. the interior of said burner, and*

*b. said combustion chamber,*

*means for automatically, separately, and simultaneously feeding air into said tube and into said combustion chamber according to the barometric demands of said combustion chamber, and means for isolating the proportion of air fed into said combustion chamber against entry into said burner tube at least in the vicinity of said location from which said burner tube projects into said combustion chamber, said air distributing means being in the form of an apertured air intake housing secured to and projecting outwardly from said enclosure, said enclosure being apertured within the confines of said housing to permit the passage of air within said distribution housing therethrough into said combustion chamber, said burner tube lying within the produced boundary of said housing, a venturi funnel for a fuel nozzle positioned in said distributing housing, the reduced end of said funnel lying substantially on the plane of said enclosure, said funnel being secured on said plane and substantially sealed around its reduced discharge end against air passage other than through the enlarged intake end thereof, said funnel being substantially co-axial with said tube, said funnel being situated substantially central of said distributing housing, the aperturing in said enclosure being arranged about said funnel and spaced therefrom, said air intake housing including a surrounding apertured wall projecting outwardly from said enclosure and an end plate spanning said apertured wall, a plenum chamber occupying the space between said apertured wall, said end plate, and the portion of said combustion chamber enclosure bounded by said apertured wall.*

*34. A fluid fuel burner including an inner burner tube having at a first end thereof a burner head, and a jacket surrounding part of said tube, characterized in that said jacket has a first end wall and a centrally apertured second end wall, said jacket and end walls defining a counterflow chamber around said inner tube, said inner tube being annularly perforated in the vicinity of said first end wall and within the confines of said first and second end walls, said inner tube and counterflow chamber being in communication in the vicinity of said second end wall and within the confines of said first and second end walls, an air distributing housing overlying said second end wall on the exterior side thereof, means for admitting air into said housing, a venturi funnel within said housing communicating with the interior of said housing and with said second end wall central aperture, said funnel being substantially coaxial with said inner tube, an injection nozzle for pulverized fuel, and aperture means within the confines of said housing and communicating between the interior of said housing and the space surrounding said burner.*

*35. The invention according to claim 5 in which said first end wall is sufficiently apertured to admit said limited volume of counterflowing air.*

*36. The method according to claim 1 which is effected within a surrounding combustion chamber and which includes the steps of admitting air to an air distributing means and dividing said air within said distributing means into two essentially enclosed and separate air streams one of which mixes with said ignited fuel and the other of which enters said combustion chamber.*

*37. A fluid fuel burner embodying an inner burner tube, a surrounding jacket, said tube and said jacket each having a first end and adjacent second ends, said jacket being spaced from said tube, a fuel nozzle assembly, an ignition electrode and combustion supporting air intake means, and including in combination:*

*i. a burner head, at the first end of said tube,*

*ii. means for providing a counterflow of ignited fuel through a counterflow chamber existing between said tube and said jacket, said counterflow being opposite in direction to the flow of, and consisting of a portion of a tongue of flammable fluid projecting through said tube from said nozzle assembly,*

*iii. the originating location of said counterflow being between said nozzle assembly and said burner head,*

*iv. means for reintroducing said counterflow back into said inner tube near said nozzle assembly, and*

*v. means for causing the flame of said tongue to be extinguished when a sufficient rise in ambient temperature has supervened, and substantially simultaneously therewith thereby causing the generation of a blue flame at the said originating location of counterflow, and at said burner head.*

*38. The invention according to claim 15 in which said burner is secured to and projects inwardly from the wall of a combustion chamber having air venting in said wall upon the outer side of said jacket and air distributing means on the external side of said wall enclosing said venting, for admitting combustion supporting air to (a) the interior of said combustion chamber through said venting, and (b) through said funnel to said burner tube.*

* * * * *